US006168747B1

(12) United States Patent
Reese et al.

(10) Patent No.: US 6,168,747 B1
(45) Date of Patent: Jan. 2, 2001

(54) CALENDERING APPARATUS AND METHOD FOR HEATING A TRAVELING MULTI-FILAMENT TOW

(75) Inventors: Glen P. Reese, Charlotte, NC (US); Marshall Ledbetter, Campobello, SC (US); Charles David Carlson, Jr., Columbus, NC (US); Johannes C. Kuppe, Weinstadt (DE)

(73) Assignee: Arteva North America S.A.R.L., Zurich (CH)

( * ) Notice: Under 35 U.S.C. 154(b), the term of this patent shall be extended for 0 days.

(21) Appl. No.: 09/334,508

(22) Filed: Jun. 21, 1999

Related U.S. Application Data

(63) Continuation-in-part of application No. 09/018,514, filed on Feb. 4, 1998, now abandoned.

(51) Int. Cl.[7] .......................... B29C 35/10; D01D 10/02; D02J 13/00

(52) U.S. Cl. ............................ 264/489; 28/219; 28/220; 264/491; 264/492; 425/174.4; 425/445

(58) Field of Search .................................. 264/489, 491, 264/492; 425/174.4, 445; 28/219, 220

(56) References Cited

U.S. PATENT DOCUMENTS

| | | | |
|---|---|---|---|
| 3,972,127 | 8/1976 | Hoshi et al. . | |
| 4,803,027 | 2/1989 | Peiffer et al. | 425/174.4 X |
| 5,175,239 | 12/1992 | Gauntt et al. | 264/489 X |
| 5,375,310 | 12/1994 | Greifeneder et al. . | |
| 5,688,536 | 11/1997 | Van Erden et al. | 425/174.4 |

FOREIGN PATENT DOCUMENTS

| | | |
|---|---|---|
| 0 089 912 | 9/1983 | (EP) . |
| 0 125 112 | 11/1984 | (EP) . |
| 46-34376 | 10/1971 | (JP) . |
| 48-93748 | 12/1973 | (JP) . |
| 51-32816 | 3/1976 | (JP) . |
| 53-45417 | 4/1978 | (JP) . |
| 63-135516 | 6/1988 | (JP) . |
| 63-211359 | 9/1988 | (JP) . |
| 63-264940 | 11/1988 | (JP) . |
| 4-136212 | 5/1992 | (JP) . |
| 594220 | 2/1978 | (SU) . |
| 867953 | 9/1981 | (SU) . |
| 958529 | 9/1982 | (SU) . |
| 1203150 | 1/1986 | (SU) . |
| 1700116 A1 | 12/1991 | (SU) . |

*Primary Examiner*—Leo B. Tentoni
(74) *Attorney, Agent, or Firm*—Gregory N. Clements

(57) ABSTRACT

A calendering apparatus and method for heatsetting a traveling multi-filament tow basically utilizes plural heated rolls about which the tow travels in a sinuous path to be conductively heated by the rolls and, at each roll, a plurality of infrared lamps in an arcuate arrangement facing the portion of the respective roll in contact with the tow simultaneously applies infrared radiation to the opposite side of the tow. In one embodiment, this arrangement of infrared lamps is retrofitted to a conventional calendering apparatus. An alternative embodiment provides for reducing or eliminating the number of calender rolls followed by a series of infrared heating tunnels collectively effective to accomplish heatsetting of the tow. The speed and/or throughput rate of each calendering apparatus and method is effectively twice that of conventional equipment of similar size.

20 Claims, 3 Drawing Sheets

CALENDERING APPARATUS AND METHOD FOR HEATING A TRAVELING MULTI-FILAMENT TOW

RELATED U.S. APLICATIONS

This is a continuation-in-part application of U.S. application Ser. No. 09/018,514 which was filed Feb. 4, 1998, now abandoned.

BACKGROUND OF THE INVENTION

The present invention relates generally to the production of synthetic polymeric material in filament form for use in fiber manufacture and, more particularly, to apparatus and methods for heatsetting such filamentary material, particularly polyethylene terephthalate (PET) materials commonly referred to as polyester.

In the conventional manufacture of synthetic yarns, a molten polymeric material is extruded in the form of multiple continuous filaments which, after quenching to cool the filaments, are gathered and transported longitudinally in a lengthwise co-extensive bundle commonly referred to as a tow. Particularly with polymeric materials such as PET, the tows are subjected to a subsequent drawing and heating operation to orient and heatset the molecular structure of each constituent filament in each tow.

A typical drawing and heatsetting operation involves transporting multiple tows in side-by-side relation sequentially through two or more drawstands operating at progressively greater driven speeds to exert a lengthwise stretching force on the tows and their individual filaments while traveling between the drawstands thereby performing a drawing to molecularly orient the individual filaments, followed by a calender structure having a series of heated rolls about which the tow travels peripherally in a sinuous path to be sufficiently heated to set the molecular orientation of the filaments. Normally, the tow is transported through a quench stand to be cooled immediately following the calender structure and is finally transported through a crimper, such as a so-called stuffer box, to impart texture and bulk to the individual filaments.

Tow drawing and heatsetting lines of the type above-described have proven to be reasonably effective and reliable for the intended purpose. However, as the fiber industry continually strives to improve efficiency and reduce manufacturing costs, much effort has been devoted to attempts to increase the number of filaments bundled in each tow and to increase the lineal traveling speed at which the filaments are processed through the drawing and heatsetting line, which presents particular difficulties and problems in construction of the apparatus within the line and in effectively accomplishing heatsetting of all of the constituent filaments in a tow.

In particular, it is not uncommon for a tow being processed through a conventional drawing and heatsetting line to have a cumulative denier of all of the constituent filaments in the tow on the order of five million denier. Polymeric materials generally, and PET in particular, exhibit a low thermal conductivity and, in a tow comprising collectively numerous individual fine denier filaments, the interstitial spaces between the individual filaments exacerbate the difficulty of transferring heat throughout the thickness of a tow. With calender rolls having the capability of only heating the tow surface in contact with the rolls, the applied heat penetrates relatively slowly through the thickness of the tow which, in turn, necessitates the provision of a sufficient number of successive calender rolls together with a sufficiently slow traveling speed to ensure that the entire thickness of the tow is uniformly heated.

To better promote more rapid heat transfer through a tow, it has become commonplace to construct calenders with cantilevered rolls to permit the spreading of the individual filaments of the tow in the form of a ribbon or band along the length of the roll.

These various factors not only increase significantly the capital investment necessary for a conventional drawing and heatsetting line, the processing lines of this type in current use nevertheless must operate at lower than desirable processing speeds in order to uniformly heatset all filaments within a tow.

SUMMARY OF THE INVENTION

It is accordingly an object of the present invention to provide an improved apparatus and method for calendering a traveling multi-filament tow to heat its individual filaments which will substantially improve the rate of heat transfer through the tow thickness and enable processing to be carried out at correspondingly increased traveling speeds of the tow. A more specific object of the present invention is to provide such improvements in calendering apparatus and methods which can be retrofitted to existing drawing and heating lines. A further object of the invention is to enable the construction and fabrication of a new generation of calendering equipment which, reduces the need for many or all of the calender rolls. Further objects, effects and advantages of the present invention will be apparent from the specification hereinafter provided.

Briefly summarized, the present invention achieves these objectives by providing a calendering apparatus and method for heating a traveling multi-filament tow which, in its most fundamental aspect, basically comprises electromagnetic radiation simultaneously applied in the direction of the traveling tow, such as by means of an electromagnetic radiation source arranged in opposed spaced facing relation to the tow.

Optionaly, the calendering apparatus and method utilizes a plurality of such heated rolls arranged relative to one another for travel of the tow in a sinuous path successively about the respective rolls, with an electromagnetic radiation source directed at the portion of each roll which is in peripheral engagement with the tow. The radiation source may produce electromagnetic waves in either of the infrared, radio or microwave spectrums, or possibly a combination thereof, although it is presently believed to be preferable to utilize infrared lamps associated with each roll in an arcuate arrangement generally conforming to the cylindrical periphery of each respective roll.

An embodiment of the present apparatus and method particularly adapted to be retrofitted to conventional calenders of the type described above would simply equip such calenders with suitable arcuate arrangements of infrared lamps adjacent one or more of the heated calender rolls of the apparatus. As an alternate embodiment, it is contemplated to provide a new form of calender apparatus and method utilizing no calendar rolls or a substantially reduced number of heated calender rolls (in comparison to conventional calenders), each of which may have associated therewith an arcuate arrangement of infrared lamps or other appropriate electromagnetic radiation source directed at the periphery of the respective roll, followed by one or more tunnels through which the tow is transported between opposing electromagnetic radiation sources, such as infrared lamps, to be further radiantly heated downstream of the calender rolls, if calender rolls are employed.

Fundamentally, this combination of calender rolls for surface heating of one side of a tow in conjunction with simultaneous electromagnetic radiant heating of the opposite side of the tow or using opposing electromagnetic radiant heating sources, enables the heating of the filaments in a tow at a rate on the order of twice that utilizing conventional surface heating of a tow by calender rolls alone and, in turn, correspondingly enables a given drawing and heating line to be operated at a lineal tow throughput speed on the order of twice that which is possible utilizing a conventional calender.

DESCRIPTION OF THE PREFERRED EMBODIMENTS

Figure 1:
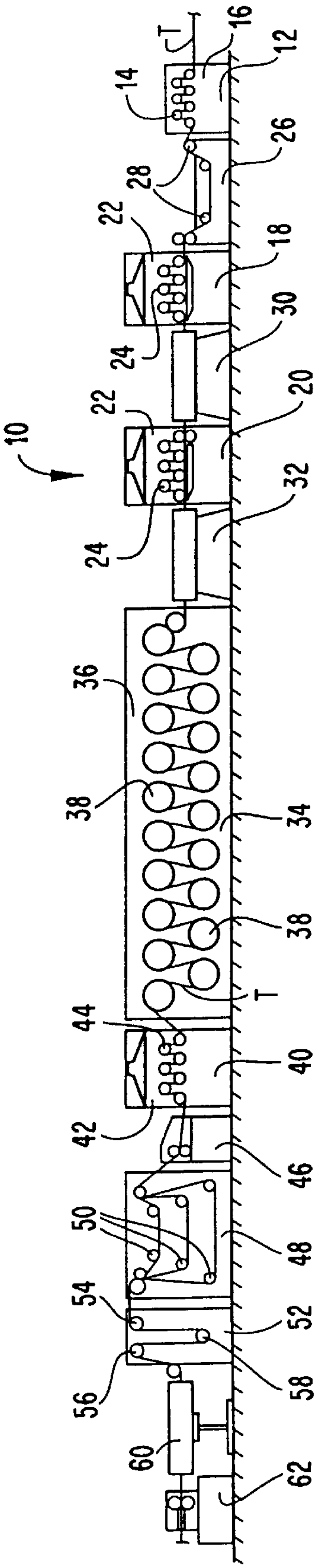
Fig. 1 PRIOR ART
FIG. 1 is a schematic diagram illustrating a conventional prior art system for drawing and heatsetting continuous filaments in the form of a tow.

Referring now to the accompanying drawings and initially to FIG. 1, a conventional PET processing line for drawing and heatsetting filamentary tow of the type over which the present invention seeks to improve is depicted schematically and indicated in its totality at 10. The line basically comprises a series of machine units arranged in alignment with one another for transport of a tow sequentially from one machine unit to the next. Preferably each machine unit comprises a central upstanding frame from one side of which tow engagement rolls extend outwardly in cantilevered fashion.

Basically, tow from storage cans or another suitable source of supply is initially delivered to a pretensioning stand 12 having a series of driven cylindrical rolls 14 arranged alternatingly along upper and lower horizontal lines along the lengthwise extent of a central frame 16 for travel of the tow t in a serpentine path in engagement with the periphery of each upper and lower roll in sequence, whereby the multiple rolls 14 collectively establish an initial tensioning point in the processing line 10 preliminary to downstream drawing of the tow t.

Two drawstands 18,20 are disposed at a downstream spacing from the pretensioning stand 12 and from one another, each drawstand 18,20 similarly comprising a central upstanding frame 22 from which multiple cylindrical cantilevered rolls outwardly extend alternatingly along upper and lower horizontal lines for travel of the tow t in like manner along a sinuous path peripherally about each roll 24 in sequence, whereby the two drawstands 18,20 establish additional tensioning points along the processing line 10. A vat 26 containing a predrawing bath, preferably a water-based emulsion, is disposed between the pretensioning stand 12 and the drawstand 18, for application to the tow t before entering the first drawstand 18. A series of rolls 28 are mounted at the entrance and exit ends of the vat 26 and also within the vat 26 below the bath level to direct the travel of the tow t for immersion in the bath. A first draw chest 30, basically constructed as an enclosed tunnel containing an atmosphere of warm water sprays, is situated between the two drawstands 18, 20 to apply warm water to the tow t while traveling between the drawstands 18,20. Another draw chest 32 is disposed at the downstream side of the second drawstand 20, but operates at a higher temperature than the first draw chest 30, applying steam to the tow t while traveling through the tunnel of the chest.

A calender frame 34 is located immediately downstream of the second draw chest 32 and basically comprises a relatively massive structure having a large central frame 36 from which a plurality of large-diameter calender rolls 38 are cantilevered outwardly alternatingly along upper and lower horizontal lines for serpentine travel of the tow t peripherally about the rolls 38 in sequence, in like manner to that previously described with respect to the pretensioning stand 12 and the drawstands 18,20. The cylindrical periphery of each calender roll 38 is heated from the interior of the roll 38 by any suitable conventional means to a sufficient temperature (selected according to the physical characteristics of the tow, its traveling speed, and other known variables) to heatset the individual filaments in the tow t, the serpentine travel of the tow t accomplishing heat application to both sides of the tow t as it travels from one roll 38 to the next.

Immediately downstream of the calender frame 34, a quench stand 40, similarly comprising a frame 42 having sequential cantilevered rolls 44 extending outwardly therefrom, is provided for cooling the tow t sufficiently below the heatsetting temperature established by the calender frame 34 to control shrinkage of the tow t. The tow t next travels from the quench stand 40 through a spray stand 46 in which a spray of a suitable finishing composition adapted to enhance subsequent crimping of the filaments in the tow t is applied to the traveling tow t.

As aforedescribed, the tow t in a conventional full speed commercial operation of the processing line 10 will typically comprise filaments totaling up to approximately five million denier and, hence, in order to optimize the uniform application of drawing forces and, in particular, heating to all constituent filaments within the tow t, the filaments are spread from the normal rope-like bundled configuration of the tow t into a thin substantially flattened ribbon-like or band-like configuration while traveling about the various rolls of the upstream machine units. However, conventional apparatus for imparting crimp to the tow t is unsuitable for handling such a flattened thin ribbon-like tow band. Hence, preparatory to a final step of crimping the tow t, the filaments must be condensed into a thicker band, which is accomplished by a so-called stacker frame 48 situated immediately downstream of the spray stand 46. The stacker frame 48 comprises a plurality of rolls 50 arranged as shown in FIG. 1 to define separate travel paths by which divided portions of the tow t can be directed to travel along independent paths, the rolls 50 which define the different tow travel paths being oriented in known manner out of parallel relation with the other rolls 50 to direct the divided portions of the tow t to a common point along the exit roll of the stacker frame 48 at which the divided portions of the tow t are reassembled atop one another to form a thicker tow band.

The tow t is delivered from the stacker frame 48 into a so-called dancer frame 52 of a known construction basically having stationary entrance and exit rolls 54,56 between which a third roll 58 is movable to take up tension fluctuations in the tow t, thereby to ensure that the tow t is delivered downstream at a substantially constant tension.

The tow t is transported from the dancer frame 52 through a steam atmosphere in a tunnel-like steam chest 60 and therefrom is delivered into a crimper 62, which may be of any known construction to impart crimp or texture to the tow t, e.g., a so-called stuffer box, a gear crimping unit, or other suitable alternative device. Downstream of the crimper 62, the thusly crimped or otherwise textured tow t is dried, then cut to staple lengths and the staple filaments collected in bale form for delivery to a conventional spinning operation for manufacture of spun yarn.

As described above, while the PET processing line 10 represents the most effective structure and methodology under the current state of the art for drawing (molecular orientation), heatsetting and texturing of continuous synthetic filaments, the overall structure is quite massive and very expensive, due in large part to the size required of the calender frame 34, particularly the diametric dimension of the calender rolls 38 and the structural requirements of the frame 36 and the bearing structures therein to support the rolls 38 against deflection, in order to satisfactorily apply heat uniformly throughout the entire tow t to all constituent filaments thereof. Even utilizing the technique of spreading the tow t into the form of a relatively thin ribbon-like tow band, the calender frame 34 must still be quite massive, as the proportions in FIG. 1 depict, and the difficulty in uniformly imparting a sufficient heatsetting temperature throughout the tow band imposes limitations on the traveling speed at which a tow t of a given collective denier can be processed.

Figure 2:
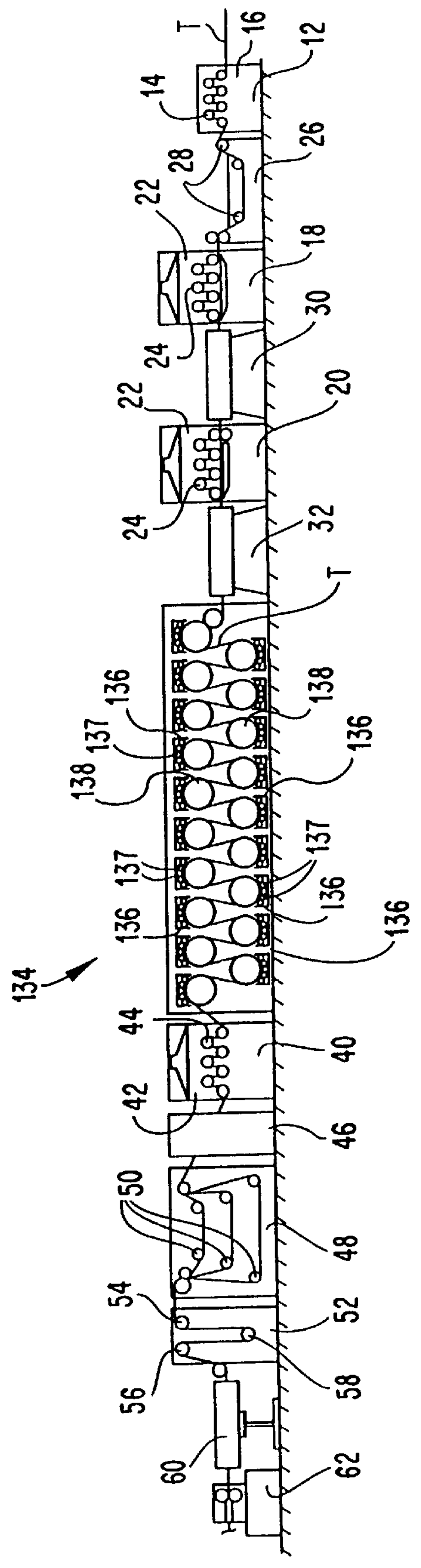
FIG. 2 is a similar schematic diagram illustrating one embodiment of a system for drawing and heatsetting a tow utilizing a calendering apparatus and method according to one embodiment of the present invention.
Figure 3:
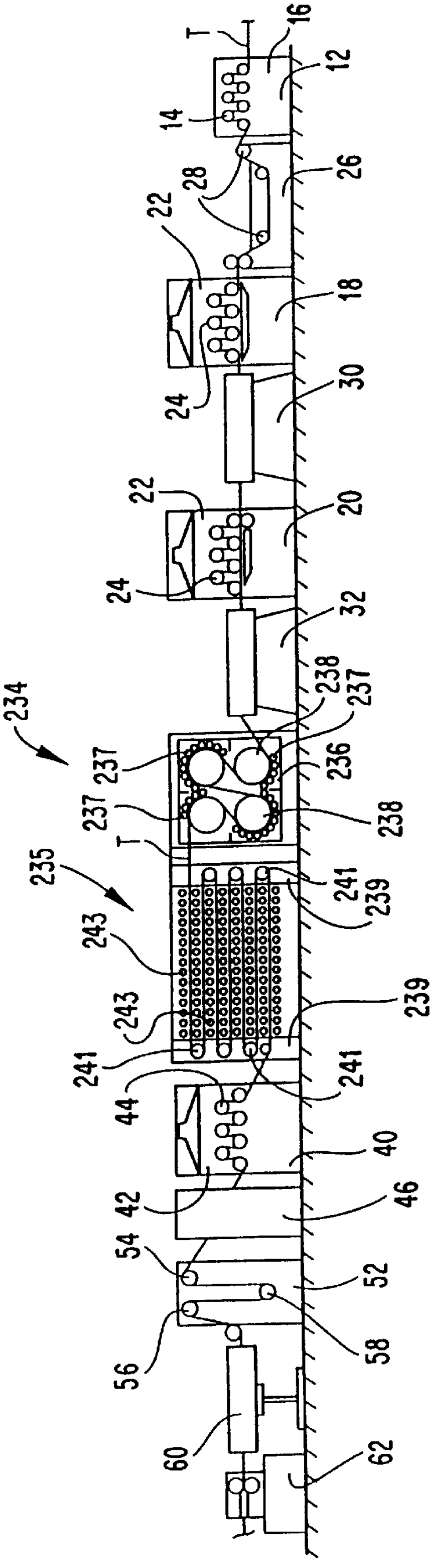
FIG. 3 is another similar schematic diagram illustrating an alternative embodiment of calendering apparatus and method according to the present invention.

Fundamentally, the present invention substantially overcomes these difficulties and disadvantages of conventional heatsetting by providing an improved calendering apparatus and methodology by which substantially increased tow processing speeds can be attained and capital outlay for heatsetting equipment may be considerably reduced. With reference to FIGS. 2 and 3 of the accompanying drawings, two differing embodiments of the present invention are depicted.

Referring initially to FIG. 2, a drawing and heatsetting line is shown with a calender frame 134 basically comprising a conventional calender frame 34 of the type shown and described above in FIG. 1 retrofitted with the present invention. Essentially the only change in the calender frame 134 over the conventional calender frame 34 is the addition of an arrangement for applying electromagnetic radiation, preferably in the form of infrared radiation, for radiant heating of the traveling tow t simultaneously with the conductive heating applied by the heated calender rolls 38. More specifically, the frame 136 is equipped with a series of subframes 136 disposed adjacently above or below each calender roll 38 along the full length thereof, with each subframe 136 supporting a plurality of infrared lamps 137 arranged side-by-side one another at a close radially outward spacing from the respective calender roll 138 along an arc following and conforming to the portion of the calender roll in peripheral heating engagement with the traveling tow t. In this manner, while conductive heat is being applied from the heated calender rolls 138 to one side of the traveling tow t, the infrared lamps 137 are applying radiant heat simultaneously to the opposite outward side of the tow t.

Advantageously, infrared radiation from the lamps 137 penetrates through the thickness of the traveling tow, rather than only applying heat to the tow surface, thereby inherently promoting heating throughout the thickness of the tow t. Moreover, as is known, the absorption of infrared radiation is relatively independent of the temperature of the material to which the radiation is applied so that, in contrast to the conductive heating by the calender rolls 138 the efficiency of which reduces as the temperature of the tow increases, this supplemental infrared heating promotes more rapid heating of the tow t to the desired heatsetting temperature. In addition, the disposition of the infrared heating lamps 137 directly opposite the portion of each respective calender roll 138 contacting the tow t provides the supplementary advantage of reducing radiant and convective heat loss from the outward surface of the tow to the ambient atmosphere.

Those persons skilled in the art will recognize that the precise rate at which the combined effect of the calender rolls 138 and the infrared lamps 137 will impart heat to the tow t will depend upon the interplay of a variety of specific factors, including, for example, but without limitation, the traveling speed of the tow, the denier of the tow, the density of the tow (particularly the interstitial air spaces within the tow), the thickness of the tow, the wavelength of the infrared radiation, and the physical (molecular) characteristics of the tow material (e.g., thermal conductivity and heat capacity), etc.

The provision in the present invention of the supplementary infrared heating lamps 137 is expected in the greater majority of embodiments to essentially double the productivity of a conventional calender frame 34, either by enabling the tow to be transported at essentially twice the lineal traveling speed at which the calender would be operated without the infrared lamps or by enabling the calender to handle a tow of twice the collective denier which would be processed in the absence of the infrared lamps, or a combination of such increases.

Of course, persons skilled in the art will also recognize that the application and advantages of the present invention's combined use of calender roll heating and infrared or other electromagnetic radiant heating is not restricted to retrofitting applications in conventional calender frames. Indeed, it is contemplated that optimal use and application of the present invention and the greatest achievement of the attendant advantages obtained therefrom can be realized by adapting the present invention to the construction of an essentially distinct generation of calender equipment, one possible embodiment of which is depicted in FIG. 3. Specifically, with the increased rates of heating achieved by the present invention and the enhanced ability to apply heat into the interior thickness of a tow as opposed to only surface heating, the prior need to utilize calender rolls, as well as the number thereof, can be significantly reduced or eliminated while still achieving effective heatsetting of a given tow at conventional throughput rates.

An exemplary form of such a calender frame is shown at 234 in FIG. 3. The calender frame 234 is basically constructed similarly to that of the calender frame 34, having a central upstanding frame 236 from one side of which heated calender rolls extend outwardly in cantilevered fashion, but a substantially reduced number of such calender rolls 238 is necessary, with only four such rolls being provided in the illustrated embodiment. Of course, the calender rolls may be eliminated altogether. As with the retrofitted calender frame 134 of FIG. 2, infrared lamps 237 in FIG. 3 are provided in an arcuate arrangement about the respective portions of the cylindrical peripheries of the rolls 238 which contact the traveling tow t to provide supplementary infrared heating. The primary calender structure of FIG. 3 is a calender tunnel unit 235 basically comprising two longitudinally spaced roll stands 239 each supporting a vertical series of deflection rolls 241 at vertically offset axes for travel of the tow t horizontally back-and-forth between the two roll stands 239 in an elongated serpentine manner. Between the two rollstands, the tunnel unit 235 defines a series of tunnel-like pathways enclosing each horizontal segment of the serpentine travel path of the tow with horizontal arrangements of infrared lamps 243 along each opposite upper and lower side of each travel path segment to provide continued application of infrared radiant heating to the traveling tow t through the tunnel unit 235.

The combination of the calender frame 234 with the tunnel unit 235 may better enable the balance between conductive surface heating of the tow t and electromagnetic radiant heating of the tow t to be more precisely engineered and controlled toward the ultimate goal of reducing the size and capital expense while achieving the most efficient application of heatsetting energy to the tow t at the highest feasible throughput speed and/or rate. As previously indicated and as will be recognized, infrared heating provides the potential for more rapid and efficient heat application throughout the thickness of a given tow.

In sum, as the foregoing specification demonstrates, the present invention advantageously serves the ultimate goal of optimizing the speed and/or rate of a tow heatsetting operation and, in turn, reducing the attendant costs thereof (either or both processing costs and capital costs) by the fundamental concept of replacing all or some of the calender roll heating of the tow with infrared radiant heating of the tow. Importantly, however, those persons skilled in the art will recognize that this basic inventive concept is not restricted to the two embodiments which have been provided for illustrative purposes only. Many other variations and possibilities within the fundamental invention as disclosed will occur to persons skilled in the art. For example, while infrared radiant heating is considered preferable within the confines of equipment and technology currently known and available, it is also contemplated that infrared heat generation and application other than by the described arrangements of infrared lamps could be utilized and, moreover, other forms of electromagnetic radiant heating, e.g., by radio frequency or microwave radiation, could be effectively implemented with many or all of the same advantages described above.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A calendaring apparatus for heating a traveling multifilament tow, the apparatus comprising: a source of multifilament tow; at least one pair of rotatable rolls, said rolls arranged for successive engagement with said tow, each of said rolls having a heated cylindrical periphery arranged for rotational heating engagement with one side of said traveling tow and means arranged in opposed spaced facing relation to an arcuate portion of said cylindrical periphery of said rolls for applying electromagnetic radiation in the direction thereof for radiant heating from an opposite side of said traveling tow.

2. A calendering apparatus for heating a traveling multifilament tow according to claim 1, wherein the means for applying electromagnetic radiation is adapted to emit radiation within at least one of the infrared, radio and microwave spectrums.

3. A calendering apparatus for heating a traveling multifilament tow according to claim 2, wherein the means for applying electromagnetic radiation comprises a plurality of lamps for generating infrared radiation.

4. A calendering apparatus for heating a traveling multifilament tow according to claim 3, wherein the infrared radiation lamps are disposed in an arcuate arrangement generally in conformity to the cylindrical periphery of the roll.

5. A calendaring apparatus for heating a traveling multifilament tow according to claim 1, further comprising a tunnel for travel of the tow therethrough following said at least one pair of rolls, the tunnel comprising means for applying electromagnetic radiation within said traveling tow for further radiant heating of said tow.

6. A calendering apparatus for heating a traveling multifilament tow according to claim 5, wherein the means for applying electromagnetic radiation within the tunnel comprises a plurality of lamps for generating infrared radiation.

7. A calendering apparatus for heating a traveling multifilament tow according to claim 5, wherein the means for applying electromagnetic radiation within the tunnel comprises a plurality of lamps for generating infrared radiation.

8. A calendering apparatus for heating a traveling multifilament tow, the apparatus comprising a plurality of rolls each having a heated cylindrical periphery and arranged relative to one another for travel of the tow in a sinuous path successively in rotational engagement with portions of the respective peripheries of the rolls for heating of opposite sides of the tow and, at each roll, a plurality of lamps for generating infrared radiation arranged in opposed spaced facing relation to the portion of the respective roll in heating engagement with one side of the traveling tow for simultaneously applying infrared radiation from the other side of the traveling tow for radiant heating thereof.

9. A calendering apparatus for heating a traveling multifilament tow according to claim 8, further comprising a tunnel for travel of the tow therethrough following the plurality of rolls, the tunnel comprising a plurality of lamps for applying infrared radiation within the tunnel to opposite sides of the traveling tow for further radiant heating of the tow.

10. A calendering method for heating a traveling multifilament tow, the method comprising providing at least one rotatable roll having a cylindrical periphery, heating the periphery of the roll, directing the tow to travel in rotational engagement with a portion of the periphery of the roll for heating one side of the tow, and simultaneously applying electromagnetic radiation in the direction of the portion of the periphery of the roll for radiant heating from an opposite side of the traveling tow.

11. A calendering method for heating a traveling multifilament tow according to claim 10, wherein the electromagnetic radiation is within at least one of the infrared, radio and microwave spectrums.

12. A calendering method for heating a traveling multifilament tow according to claim 11, wherein the electromagnetic radiation is applied radially toward the portion of the periphery of the roll from an arc spaced radially outwardly from the roll and generally conforming to the cylindrical periphery thereof.

13. A calendering method for heating a traveling multifilament tow according to claim 10, further comprising providing a second said rotatable roll with a cylindrical periphery, heating the periphery of the second roll, directing the tow following the first-mentioned at least one roll to travel in successive rotational engagement with a portion of the respective periphery of the second roll, and simultaneously applying electromagnetic radiation in the direction of the portion of the periphery of the second roll for radiant heating of the traveling tow.

14. A calendering method for heating a traveling multifilament tow according to claim 13, further comprising directing the tow following the second roll to travel through a tunnel while applying electromagnetic radiation to opposite sides of the traveling tow within the tunnel.

15. A calendering method for heating a traveling multifilament tow according to claim 14, wherein the electromagnetic radiation applied within the tunnel is infrared radiation.

16. A calendering method for heating a traveling multifilament tow according to claim 10, further comprising directing the tow following the at least one roll to travel through a tunnel while applying electromagnetic radiation to opposite sides of the traveling tow within the tunnel.

17. A calendering method for heating a traveling multifilament tow according to claim 16, wherein the electromagnetic radiation applied within the tunnel is infrared radiation.

18. A calendering method for heating a traveling multifilament tow, the method comprising providing a plurality of rolls each having a cylindrical periphery, heating the periphery of each roll, directing the tow to travel in a sinuous path successively in rotational engagement with portions of the respective peripheries of the rolls for heating of opposite sides of the tow, and at each roll, simultaneously generating infrared radiation from along an arc spaced radially outwardly from the roll and generally conforming to the cylindrical periphery thereof and directing the infrared radiation radially toward the portion of the periphery of the respective roll in heating engagement with one side of the traveling tow for simultaneous radiant heating of the other side of the traveling tow.

19. A calendering method for heating a traveling multifilament tow according to claim 18, further comprising directing the tow following the plurality of rolls to travel through a tunnel while applying electromagnetic radiation to opposite sides of the traveling tow within the tunnel.

20. A calendering method for heating a traveling multifilament tow, the method comprising, directing the tow to travel in a sinuous path through a tunnel while applying electromagnetic radiation to opposite sides of the traveling tow within the tunnel.

* * * * *